United States Patent
Nagatsuka et al.

(10) Patent No.: US 7,269,463 B2
(45) Date of Patent: Sep. 11, 2007

(54) PLANT OPERATING APPARATUS AND METHOD

(75) Inventors: Hideki Nagatsuka, Hitachi (JP); Junichi Suzuki, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/682,554

(22) Filed: Oct. 10, 2003

(65) Prior Publication Data

US 2004/0078094 A1  Apr. 22, 2004

Related U.S. Application Data

(63) Continuation of application No. 10/247,649, filed on Sep. 20, 2002.

(30) Foreign Application Priority Data

Jan. 18, 2002  (JP) .............................. 2002-009754

(51) Int. Cl.
| | |
|---|---|
| G05B 11/01 | (2006.01) |
| G05B 15/00 | (2006.01) |
| G05B 23/02 | (2006.01) |
| G06F 13/42 | (2006.01) |
| G06F 11/00 | (2006.01) |
| G06F 15/00 | (2006.01) |
| H03F 1/26 | (2006.01) |

(52) U.S. Cl. .......................... 700/17; 700/19; 700/20; 700/83; 340/825; 340/3.1; 702/188; 702/189

(58) Field of Classification Search ................. 700/83, 700/17, 19–20; 340/825.1, 540, 825; 370/352; 345/800; 702/188–189, 113; 709/208, 223–227

See application file for complete search history.

(56) References Cited

U.S. PATENT DOCUMENTS

| | | | | |
|---|---|---|---|---|
| 5,258,652 A | * | 11/1993 | Nigawara et al. .............. | 307/38 |
| 5,598,572 A | * | 1/1997 | Tanikoshi et al. .............. | 712/30 |
| 5,650,940 A | * | 7/1997 | Tonozuka et al. ........... | 709/224 |
| 6,167,464 A | * | 12/2000 | Kretschmann ................ | 710/15 |
| 6,236,334 B1 | * | 5/2001 | Tapperson et al. ...... | 340/825.37 |

(Continued)

FOREIGN PATENT DOCUMENTS

JP  8-044407  2/1996

(Continued)

OTHER PUBLICATIONS

Partial English translation of Japanese publication No. 2000-89872.

*Primary Examiner*—Ron D Hartman, Jr.
(74) *Attorney, Agent, or Firm*—Crowell & Moring LLP

(57) ABSTRACT

In a CRT operation system for operation and monitoring of plant equipment in a plant worksite through a central control room and a network, an operation control personal computer is provided for monitoring and operating the plant equipment, and one or more wireless LAN transceivers or transmitting/receiving sections are provided to appropriate points in a patrol route around the plant equipment, for wireless communication with the operation control personal computer. The personal computer controls the plant equipment through a wireless transceiver and a network, and transmits therethrough information signals of on-site operation of the plant equipment to enable a display device and a sound/voice output device provided in the central control room.

10 Claims, 7 Drawing Sheets

U.S. PATENT DOCUMENTS

| | | |
|---|---|---|
| 6,244,015 B1 * | 6/2001 | Ito et al. .................... 52/741.1 |
| 6,252,510 B1 * | 6/2001 | Dungan ...................... 340/632 |
| 6,269,299 B1 * | 7/2001 | Blotenberg ................ 701/100 |
| 6,400,997 B1 * | 6/2002 | Rapp, III ..................... 700/83 |
| 6,437,692 B1 * | 8/2002 | Petite et al. ................ 340/540 |
| 6,459,371 B1 * | 10/2002 | Pike ........................ 340/539.1 |
| 2002/0130846 A1 * | 9/2002 | Nixon et al. ................ 345/169 |
| 2002/0159441 A1 * | 10/2002 | Travaly et al. .............. 370/352 |
| 2003/0061295 A1 * | 3/2003 | Oberg et al. ................ 709/208 |
| 2004/0260518 A1 * | 12/2004 | Polz et al. .................. 702/188 |

FOREIGN PATENT DOCUMENTS

| | | |
|---|---|---|
| JP | 2000-089872 | 3/2000 |
| JP | 2001-333128 | 11/2001 |

\* cited by examiner

FIG.3
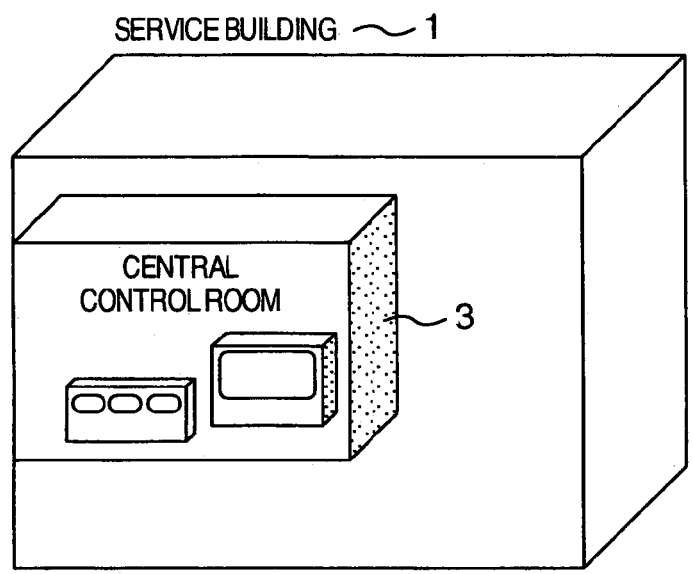
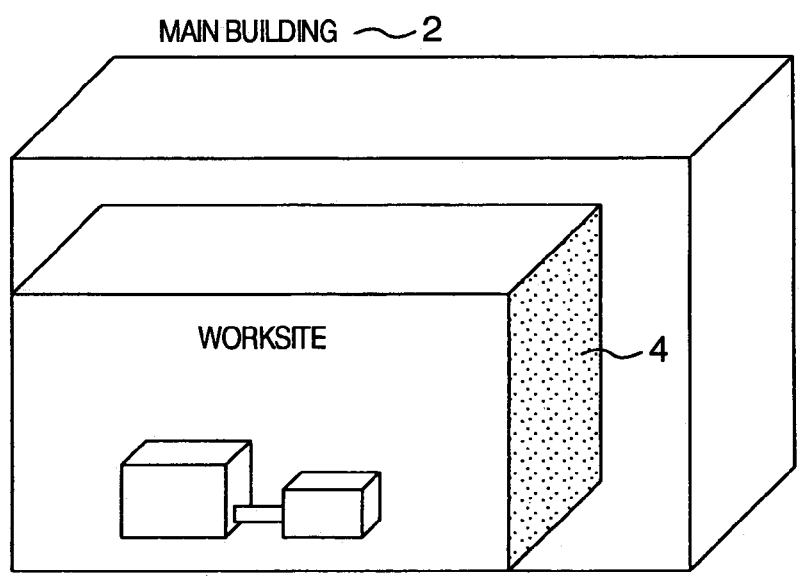

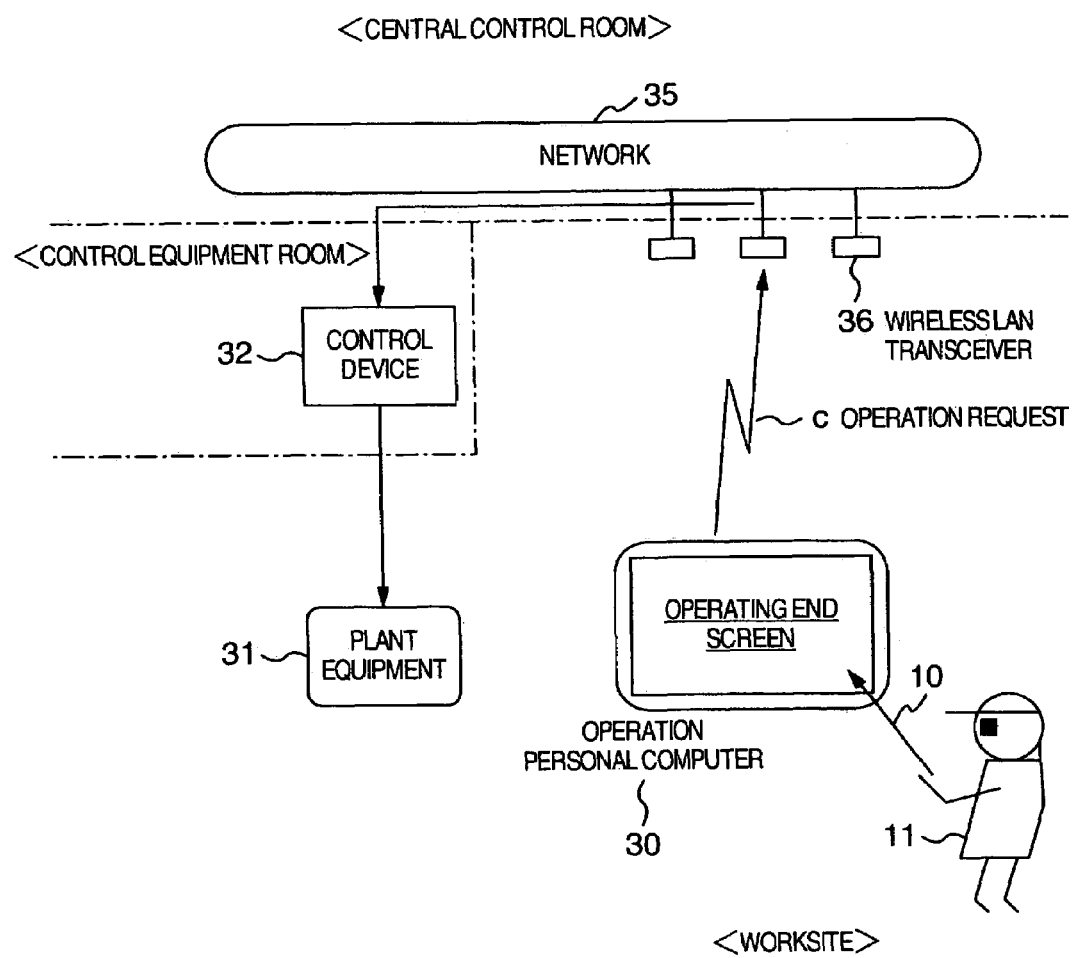

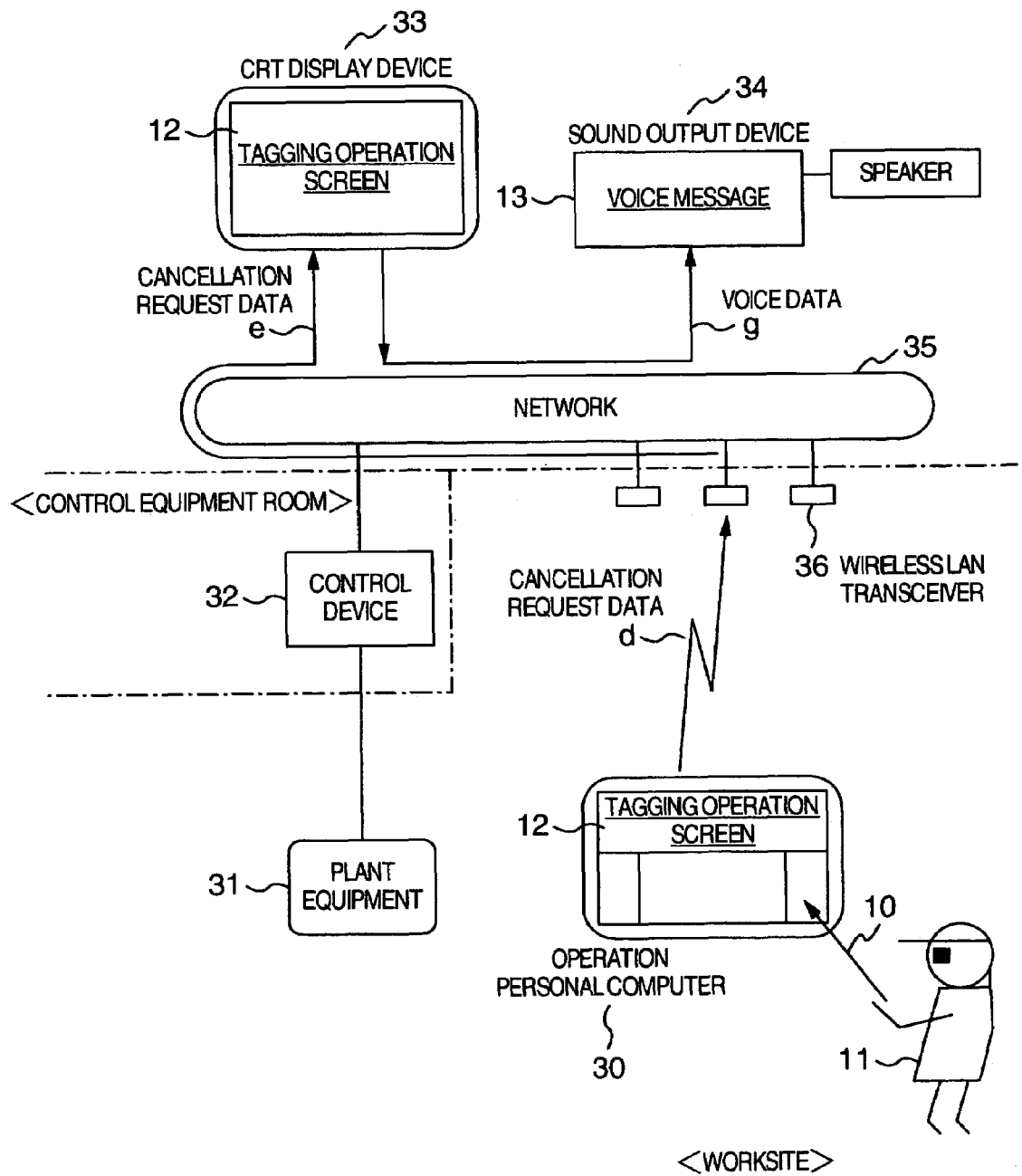

PLANT OPERATING APPARATUS AND METHOD

This application is a continuation of application Ser. No. 10/247,649, filed Sep. 20, 2002.

BACKGROUND OF THE INVENTION

The present invention relates to an apparatus and a method for operating a plant such as a thermal power plant.

In present CRT operation systems (those displaying information necessary for the operation of certain equipment on the screen of a CRT display device and thereby letting an operator operate the equipment) for plants such as thermal power plants, an operating end image (an image or a frame of information displayed on the screen, indicating the status etc. of the plant equipment at the operating end) is displayed on a CRT display device of a plant operation control panel which is installed in the central control room of the plant, and an operator in front of the plant operation control panel carries out the CRT operation of the plant equipment.

In a conventional plant operating method, when the operation or monitoring of certain plant equipment became necessary for a performance test after plant inspection etc., the operating end image is displayed on the CRT display device of the plant operation control panel and the CRT operation is carried out by an operator in the central control room. By an operation request from the CRT display device (having a function for receiving requests/instructions from the operator), a control signal for the plant equipment is outputted and thereby the plant equipment is operated by a control device via a network. The CRT display device acquires data concerning the operated plant equipment and displays the data on its status display screen. Meanwhile, a sound output device acquires sound data and thereby informs the operator about the condition or status of the plant by use of sound or voice.

Incidentally, when certain plant equipment has to be closely observed or watched, one or more observers are generally placed nearby the plant equipment in order to continuously watch the plant equipment. In case where abnormality or failure occurred to the plant equipment and emergency shut down became necessary, the central control room is informed of the situation by a telephone call from the observer using internal telephone.

In a system disclosed in Japanese Patent Application Laid-Open No. HEI8-44407 (JP-A-8-44407), even an operator not located in front of the display device was allowed to operate the plant equipment, by means of infrared signal transmission. However, the directivity of infrared communication required the operator (carrying out the operation of the plant equipment) stay in the room (central control room etc.) where the display device is installed, that is, there was restriction on the place for carrying out the equipment operation.

As described above, in the conventional CRT operation system for a thermal power plant, when certain plant equipment requiring operation or monitoring is to be operated, an operator operates the plant equipment from such a CRT display device of a plant operation control panel which is installed in the central control room of the plant, while the plant equipment is closely observed by one or more observers at the plant worksite. Therefore, much man power is required for the operation and monitoring of the plant equipment. When abnormality of failure occurred to the plant equipment and an emergency operation (emergency shut down, etc.) became necessary, the observer at the plant worksite has to make contact with the operator in the central control room, in which a delay in making the contact can cause damage to the plant equipment.

SUMMARY OF THE INVENTION

It is therefore the primary object of the present invention to provide a plant operating apparatus and a plant operating method by which the plant equipment can be operated not only from a limited place (central control room etc.) but also from the worksite where the plant equipment is placed.

In order to attain the above object, an operation terminal and a wireless transceiver for communicating with the operation terminal via radio waves are provided and the plant equipment is operated by transmitting an operation request signal from the operation terminal via the wireless transceiver or transmitting/receiving section, and the network.

BRIEF DESCRIPTION OF THE DRAWINGS

The objects and features of the present invention will become more apparent from the consideration of the following detailed description taken in conjunction with the accompanying drawings, in which:

FIG. 3 is a schematic diagram showing an example of the placement of facilities in a thermal power plant;

FIG. 6 is a schematic diagram showing an example of an operating procedure in the CRT operation; and FIG. 7 is a schematic diagram showing a method for informing an operator in the central control room that a tagging operation has been carried out by an operator of the plant worksite.

DESCRIPTION OF THE EMBODIMENTS

Figure 1:
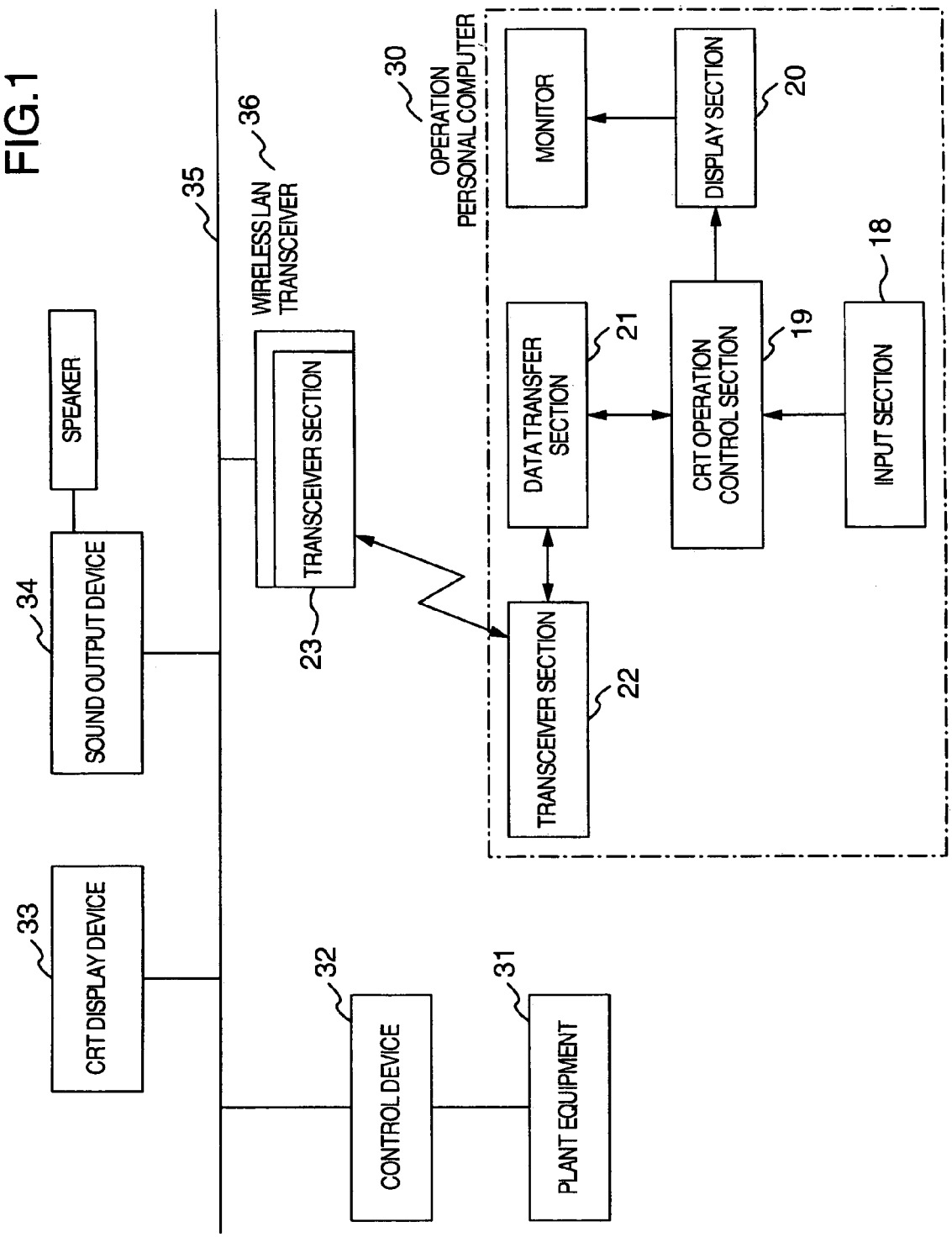
FIG. 1 is a block diagram showing a worksite monitoring/operation system as a plant operating apparatus in accordance with an embodiment of the present invention.

Referring now to the drawings, a description will be given in detail of preferred embodiments in accordance with the present invention.

FIG. 1 is a block diagram showing a worksite monitoring/operation system as a plant operating apparatus in accordance with an embodiment of the present invention. The worksite monitoring/operation system shown in FIG. 1 includes: an operation personal computer 30 (personal computer as an operation terminal) having a radio communication function for displaying the operating end screen concerning plant equipment 31 and letting a plant operator carry out the CRT operation of the plant equipment 31 from the plant worksite; a control device 32 for controlling the plant equipment 31; a CRT display device 33 for displaying the status or condition of the plant; a sound output device 34 for informing of the status/condition of the plant by use of sound or voice; a network 35 for connecting the above devices (except the operation personal computer 30) together; and a wireless LAN (e.g., IEEE802.11) transceiver 36 which is placed at the plant worksite for communicating data with the operation personal computer 30 and thereby connecting the operation personal computer 30 with the network 35. Incidentally, while a wireless LAN is used in this example for the connection between the network 35 and the operation personal computer 30, the connection can be implemented by any type of radio communication.

The operation personal computer 30 includes an input section 18, a CRT operation control section 19, a display section 20, a data transfer-section 21 and a transceiver section 22. The input section 18 receives instructions/requests such as a CRT operation request and a screen display requests from the operator. The CRT operation control section 19 generates CRT operation data based on input data and sends the CRT operation data to the data transfer section 21, while generating data for monitor display and sending the data to the display section 20. When the data transfer section 21 received data from the CRT operation control section 19, the data transfer section 21 issues a transmission request, thereby wireless connection between the transceiver section 22 of the operation personal computer 30 and a transceiver section 23 of the wireless LAN transceiver 36 is established and data communication is carried out.

Figure 2:
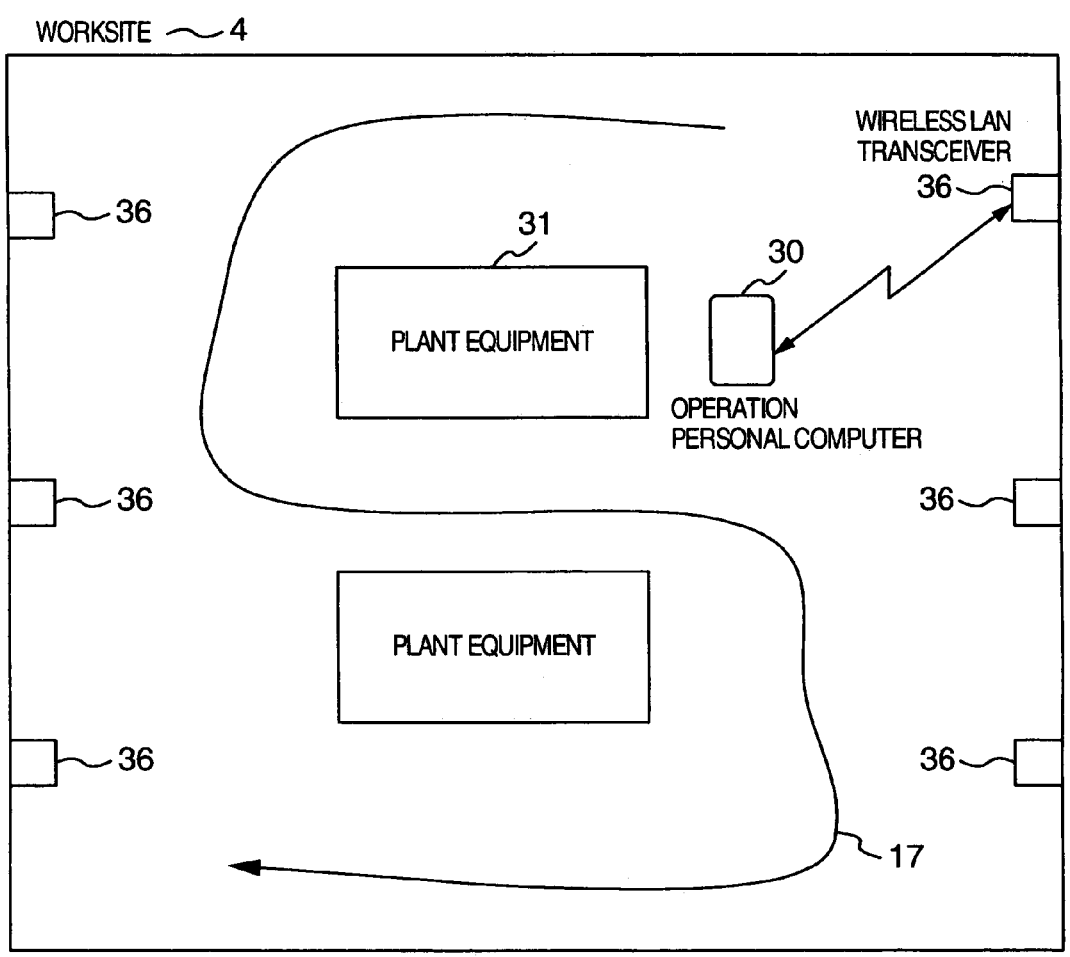
FIG. 2 is a schematic diagram showing an example of the arrangement of wireless LAN transceivers at the plant worksite.

FIG. 2 is a schematic diagram showing an example of the arrangement of the wireless LAN transceivers 36 at the plant worksite. In the example of FIG. 2, a plurality of wireless LAN transceivers 36 are placed at appropriate points (near the plant equipment 31 as the target of the CRT operation or near a patrol route 17) in the plant worksite 4, thereby data transmission/reception to/from the operation personal computer 30 is made possible regardless of where the operation personal computer 30 is located. In the data transmission/reception, one or more wireless LAN transceivers 36 in the vicinity of the operation personal computer 30 detect signals from the operation personal computer 30, and a wireless LAN transceiver 36 nearest to the operation personal computer 30 carries out data communication with the operation personal computer 30.

Figure 4:
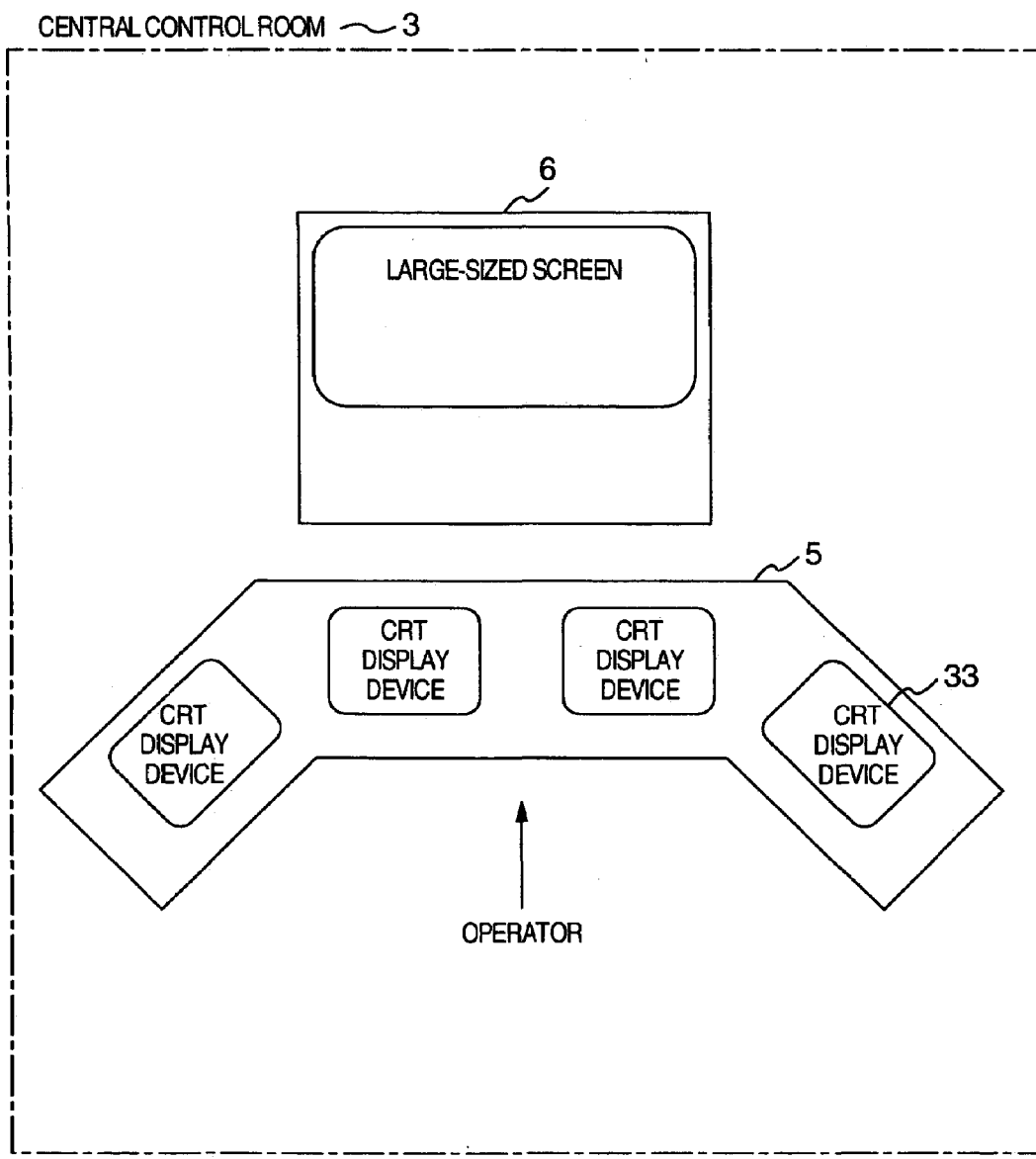
FIG. 4 is a schematic diagram showing an example of instruments of the central control room of the thermal power plant.

FIG. 3 is a schematic diagram showing an example of the placement of facilities in a thermal power plant. As shown in FIG. 3, the thermal power plant is mainly composed of a service building 1 and a main building 2. The service building 1 includes a central control room 3. The CRT display device 33 and the sound output device 34 are placed in the central control room 3, and the CRT operation and condition monitoring of the plant are carried out in the central control room 3. At the plant worksite 4 in the main building 2, each plant equipment 31 is installed. In many thermal power plants, the central control room 3 (for the CRT operation and the condition monitoring) and the plant worksite 4 (where the plant equipment 31 is installed) are located apart from each other as shown in FIG. 3. FIG. 4 shows an example of instruments of the central control room 3. In the central control room 3 of FIG. 4, CRT display devices 33 and a large-sized screen 6 are placed on a plant operation control panel 5, and one or more operators in front of the plant operation control panel 5 operate the plant equipment 31 and monitor the operational status of the plant equipment 31.

In the following, an example of a CRT operation sequence for operating the plant equipment 31 from the operation personal computer 30 at the plant worksite 4 will be explained.

Figure 5:
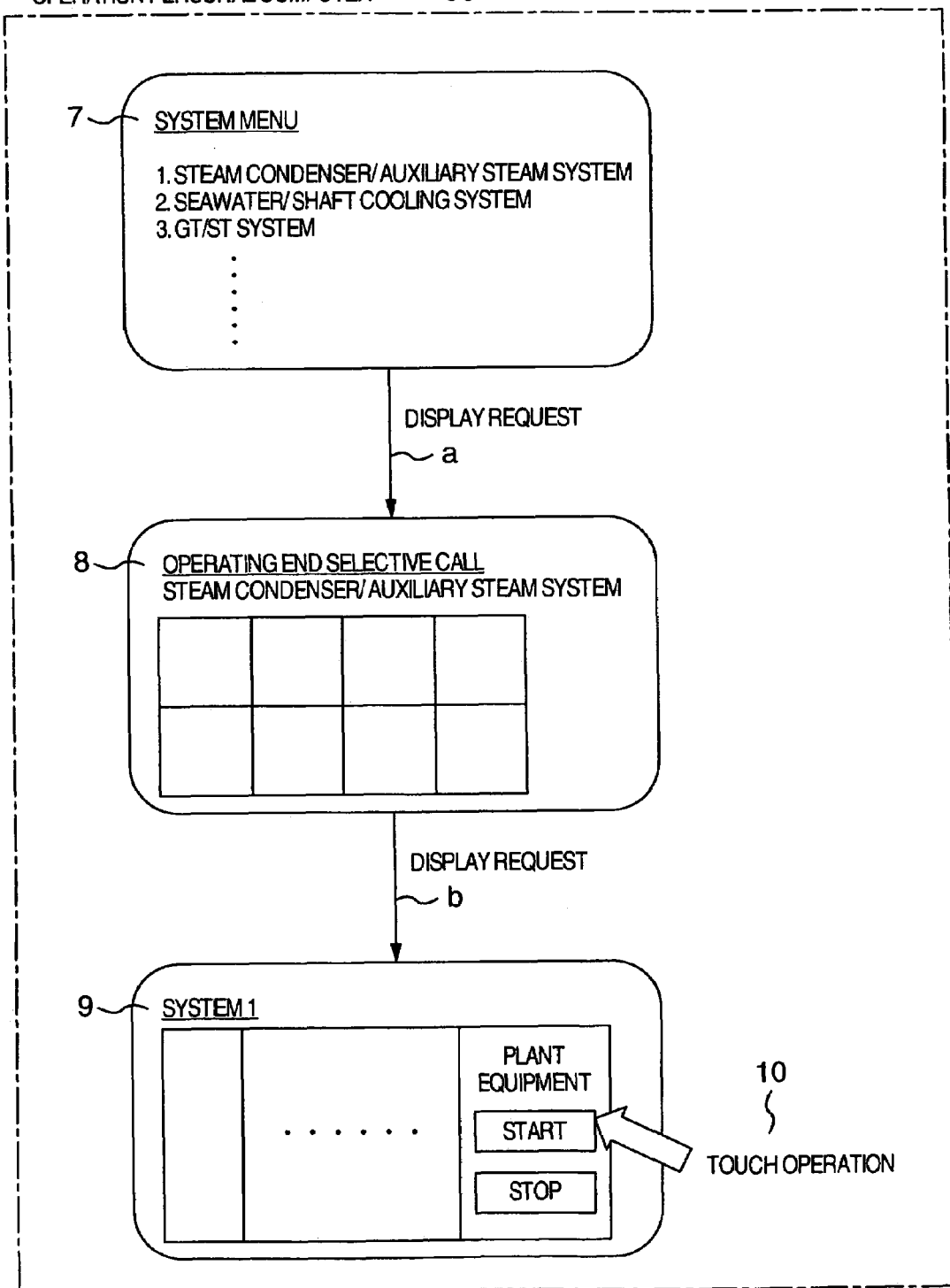
FIG. 5 is a schematic diagram showing an example of a screen display sequence in the CRT operation.

FIG. 5 shows an operating procedure when an operator lets the operation personal computer 30 display the CRT operation operating end screen and issues a request for operating the plant equipment 31. First, a CRT operation system menu 7 is displayed on the monitor of the operation personal computer 30. By a display request A of the operator selecting "STEAM CONDENSER/AUXILIARY STEAM SYSTEM" from the system menu 7, an operating end selective call screen 8 is displayed on the monitor. Next, by a display request B of the operator selecting an operating end "SYSTEM 1" from the operating end selective call screen 8, a CRT operation operating end frame screen 9 of "SYSTEM 1" is displayed on the monitor. By a touch operation 10 on a "START" icon of "PLANT EQUIPMENT" which is displayed on the operating end frame screen 9, the operator starts and execute the operation of the plant equipment 31.

FIG. 6 shows a procedure till the plant equipment 31 (for which the CRT operation request has been issued in the operating procedure of FIG. 5) is operated. By the touch operation 10 (as shown in FIG. 5) by the worksite operator 11 at the plant worksite 4, the operation personal computer 30 outputs an operation request C. The operation request C outputted by the operation personal computer 30 as a radio signal is received by one of the wireless LAN transceivers 36 and is transmitted to the control device 32 via the network 35, thereby the plant equipment 31 is operated.

As above, by letting the worksite operator 11 carry out the above procedure at the plant worksite 4 by use of the operation personal computer 30 regardless of place, both the monitoring (observation) and the operation of the plant equipment 31 can be conducted by only one worksite operator 11, thereby necessary labor and man power can be reduced considerably. In case where emergency shut down of the plant equipment 31 became necessary (when abnormality or failure of the plant equipment 31 is found, for example), the worksite operator 11 monitoring the plant equipment 31 can shut down the plant equipment 31 timely by carrying out the touch operation 10, without the need of making contact with the central control room 3.

FIG. 7 shows a method for informing an operator in the central control room that a tagging operation has been carried out by a worksite operator 11 of the plant worksite 4. Here, the "tagging operation" means an operation for putting/removing a tag, label or operation mark on/from desired plant equipment 31 when the CRT operation of the plant equipment 31 have to be prohibited/permitted. Plant equipment 31 to which the tag has been set can not be operated by the operators, and the operation of the plant equipment 31 is allowed if the tag is canceled. In the example of FIG. 7, when a worksite operator 11 carried out the tagging operation by use of the operation personal computer 30 at the plant worksite 4, operators in the central control room 3 are also informed of the tagging operation thanks to a tagging operation information function of the system.

For example, when the worksite operator 11 wants to cancel (remove) the tag of certain plant equipment 31 and carry out the CRT operation of the plant equipment 31, the worksite operator 11 issues a tag cancellation request 10 from the operation personal computer 30. Cancellation request data d transmitted by the operation personal computer 30 is received by the wireless LAN transceiver 36, and cancellation request data e (corresponding to the cancellation request data d) is received by the CRT display device 33 in the central control room 3 via the network 35, thereby the tag (tagged state) of the plant equipment 31 is canceled and the operation of the plant equipment 31 is enabled. When the tag is canceled, the CRT display device 33 in the central control room 3 automatically displays a message (indicating the cancellation of the tag) on a tagging operation screen 12 in order to inform the operators of the cancellation. The CRT display device 33 further outputs voice data g to the sound output device 34 and thereby voice message 13 (indicating the cancellation of the tag from the plant worksite 4) is outputted by the sound output device 34.

By the function described above, the operators in the central control room 3 are allowed to recognize and keep track of operations effected by the worksite operator 11 (about which plant equipment 31 was operated, when the plant equipment 31 was operated, how the plant equipment 31 was operated, etc.), thereby misoperation, misdirection, etc. can be avoided and the safety of the CRT operation from the plant worksite 4 can be improved.

As set forth hereinabove, in the plant operating apparatus and the plant operating method in accordance with the present invention, the worksite operator 11 monitoring or observing the plant equipment 31 is allowed to directly operate the plant equipment 31 from the plant worksite 4 by use of the on-site CRT operation function, thereby necessary labor and man power can be reduced considerably. When emergency operation such as emergency shut down of the plant equipment 31 became necessary, the worksite operator 11 can shut down the plant equipment 31 timely and immediately without the need of making contact with the central control room 3, thereby the safety in the plant can be improved.

By letting the operator's in the central control room 3 recognize and keep track of the operation by the worksite operator 11 at the plant worksite 4, the safety and operability of the CRT operation can be improved remarkably.

Further, by providing the wireless LAN transceivers 36 at appropriate points (near the patrol route, for example), both the monitoring (observation) and the operation of the plant equipment 31 can be carried out at the plant worksite 4 or in the vicinity of the plant worksite 4.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An apparatus for operating power plant equipment of a power plant worksite through a network by a remote control signal through wireless communication from the power plant worksite, said apparatus comprising:
    a mobile operation terminal for inputting a signal of a requested operation of said power plant equipment and generating a radio wave signal of the input signal, said operation terminal being movable to an optional point of possible moving routes thereof at said power plant worksite;
    a plurality of wireless transceivers located in the power plant worksite, with each of said wireless transceivers being located at a respective appropriate point of said routes in order for wireless communication with said mobile operation terminal by the generated radio wave; and
    a control device connected to said power plant equipment and connected to said wireless transceivers and an operation device in a central control room via said network, wherein
    the requested operation of said power plant equipment is effected under control of said control device enabled with a control signal transmitted from one of said wireless transceivers enabled with its receipt of the radio wave signal generated by said mobile operation terminal, wherein
    operation of said power plant equipment is monitorable by said mobile operation terminal in a timely and immediate manner without contact with said central control room,
    said operation device in the central control room is operatively configured to electrically connect to said wireless transceivers via the network to establish communication between said operation device and said mobile operation terminal through the network and the wireless transceiver,
    said mobile operation terminal is operatively configured to issue an alternative to an operation request issued by said operation device to said control device through the wireless transceiver and the network to operate said power plant equipment without making contact with the central control room, and
    said operation device in the central control room is operatively configured to display state information concerning the alternative operation request issued by said mobile operation terminal on a screen of said operation device.

2. The apparatus of claim 1, wherein the mobile operation terminal and the central control room are operatively arranged in parallel with said control device.

3. A method of operating power plant equipment of a power plant worksite, said method comprising operating the power plant equipment through a network;
    inputting an equipment operation request signal to a mobile operation terminal movable along possible patrol routes in said power plant worksite;
    carrying out wireless communication between the mobile operation terminal and at least one transceiver placed at appropriate points in the power plant worksite and each at least one transceiver being placed at a respective one of the appropriate points of said patrol routes for potential wireless communication with said operation terminal, wherein said at least one transceiver is adapted to electrically connect to said network, said mobile operation terminal is configured to establish communication with an operation device installed in a central control room through the transceiver and the network;
    transmitting the equipment operation request signal through the wireless communication from said mobile operation terminal and via the network to control operation of said power plant equipment without making contact with the central control room, wherein said equipment operation request signal is an alternative to an operation request signal issued by said operation device so that said mobile operation terminal can control said power plant equipment instead of said operation device,
    operation of said power plant equipment is monitorable by said mobile operation terminal in a timely and immediate manner without contact with said central control room, and
    displaying state information concerning the alternative operation request signal issued by said mobile operation terminal on a screen of said operation device in the central control room.

4. The method of claim 3, wherein the mobile operation terminal and the central control room are operatively arranged in parallel with said control device.

5. In a system for operating power plant equipment, an apparatus for enabling remote operation control of said power plant equipment through wireless communication from a power plant worksite where said power plant equipment is placed, said apparatus comprising:

a mobile operation terminal for inputting a signal for requesting a control operation and generating a radio wave signal of the input signal, said mobile operation terminal being movable to any of optional points of its potential patrol routes in said power plant worksite;

a plurality of wireless transceivers located at appropriate points near said power plant equipment and each of said transceivers being located at a respective one of the appropriate points in said patrol routes that enables any one of said transceivers nearest to said mobile operation terminal moved to an optional point of said patrol routes to receive the radio wave signal generated by said mobile operation terminal to produce a control signal for the operation of said power plant equipment; and a control device connected to said power plant equipment and an operation device in a central control room and said wireless transceivers through said network to receive the control signal produced from said one of said transceivers through said network and operate said power plant equipment in response to the received control signal, wherein the requested operation of said power plant equipment is effectuable from said mobile operation terminal located at any optional point in said power plant worksite instead of an operation control from said central control room wherein operation of said power plant equipment is monitorable by said mobile operation terminal in a timely and immediate manner without contact with said central control room, said operation device in the central control room is operatively configured to electrically connect to said wireless transceivers via the network to establish communication between said operation device and said mobile operation terminal through the network and the wireless transceiver, said mobile operation terminal is operatively configured to issue an alternative to an operation request issued by said operation device to said control device through the wireless transceiver and the network to operate said power plant equipment without making contact with the central control room, and said operation device in the central control room is operatively configured to display state information concerning the alternative operation request issued by said mobile operation terminal on a screen of said operation device.

6. The apparatus of claim 5, wherein said mobile operation terminal includes means for displaying control data information which is the same as that displayed in said central control room.

7. The system of claim 5, wherein the mobile operation terminal and the central control room are operatively arranged in parallel with said control device.

8. In a system for operating power plant equipment, a method of remotely controlling operation of the power plant equipment from any optional point of a power plant worksite where the power plant equipment is placed, the remote control being effected through wireless communication between a mobile operation terminal movable with an operator person to any optional point of potential patrol routes in the power plant worksite, and a plurality of transceivers located at the power plant worksite and connected to an operative device in a central control room and a control device through a network, said control device being connected to said power plant equipment, wherein said mobile operation terminal is configured to establish communication with said operation device in the central control room through the transceiver and the network comprising:

inputting a control request signal to the mobile operation terminal moved to an optional point of said patrol route for operation of the power plant equipment to generate and transmit a radio wave signal of the input request signal;

receiving the transmitted radio wave signal by one of said transceivers and generating a corresponding operation control signal, said one of said transceivers being as near as possible to said mobile operation terminal moved to said optional point of said patrol routes by the location of said transceivers each located at a respective appropriate point in said patrol routes, that enables any one of said transceivers nearest to said mobile operation terminal moved to an optional point of said patrol routes to receive the radio wave signal generated by said mobile operation terminal to produce a control signal for the operation of said power plant equipment;

transmitting the generated corresponding operation control signal to said control device via said network and said power plant equipment to control the operation of said power plant equipment without making contact with the central control room, wherein said generated corresponding operation control signal is an alternative to a control request signal issued by said operation device so that said mobile operation terminal can control said power plant equipment instead of said operation device, operation of said power plant equipment is monitorable by said mobile operation terminal in a timely and immediate manner without contact with said central control room, and displaying state information concerning the alternative control request signal issued by said mobile operation terminal on a screen of said operation device in the central control room.

9. The method of claim 8, comprising displaying control data information which is the same as that displayed in said central control room.

10. The method of claim 8, wherein the mobile operation terminal and the central control room are operatively arranged in parallel with said control device.

* * * * *